United States Patent
Oertli et al.

(10) Patent No.: US 8,372,514 B2
(45) Date of Patent: Feb. 12, 2013

(54) MOISTURE-CURING COMPOSITION COMPRISING AT LEAST TWO POLYMERS HAVING SILANE GROUPS

(75) Inventors: Marcel Oertli, Zurich (CH); Barbara Jucker, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/744,229

(22) PCT Filed: Sep. 24, 2008

(86) PCT No.: PCT/EP2008/062755
§ 371 (c)(1),
(2), (4) Date: May 21, 2010

(87) PCT Pub. No.: WO2009/065654
PCT Pub. Date: May 28, 2009

(65) Prior Publication Data
US 2010/0247929 A1    Sep. 30, 2010

(30) Foreign Application Priority Data

Nov. 21, 2007  (EP) .................................. 07121209

(51) Int. Cl.
*B32B 9/04* (2006.01)
*B32B 37/12* (2006.01)
*C08L 77/00* (2006.01)
*C08L 83/08* (2006.01)

(52) U.S. Cl. ......... 428/446; 525/424; 524/538; 156/329

(58) Field of Classification Search .................. 428/446; 525/424; 524/538; 156/329
See application file for complete search history.

(56) References Cited

U.S. PATENT DOCUMENTS

| | | | |
|---|---|---|---|
| 3,971,751 A | 7/1976 | Isayama et al. | |
| 5,364,955 A | 11/1994 | Zwiener et al. | |
| 5,990,257 A * | 11/1999 | Johnston et al. | 528/28 |
| 6,001,946 A * | 12/1999 | Waldman et al. | 528/28 |
| 6,046,270 A * | 4/2000 | Roesler et al. | 524/590 |
| 6,207,766 B1 | 3/2001 | Doi et al. | |
| 6,515,096 B2 * | 2/2003 | Windmueller et al. | 528/38 |
| 6,545,087 B1 * | 4/2003 | Schmalstieg et al. | 525/38 |
| 6,809,170 B2 * | 10/2004 | Roesler et al. | 528/28 |
| 7,863,374 B2 * | 1/2011 | Shibahara et al. | 524/588 |
| 2002/0100550 A1 * | 8/2002 | Mahdi et al. | 156/329 |
| 2003/0153712 A1 * | 8/2003 | Ludewig et al. | 528/10 |
| 2004/0072921 A1 * | 4/2004 | Stanjek et al. | 521/155 |
| 2005/0101753 A1 * | 5/2005 | Schindler et al. | 528/34 |
| 2005/0215701 A1 * | 9/2005 | Porsch et al. | 524/589 |
| 2006/0128919 A1 | 6/2006 | Okamoto et al. | |
| 2006/0173140 A1 * | 8/2006 | Roesler et al. | 525/474 |
| 2007/0055010 A1 * | 3/2007 | Ludewig et al. | 524/589 |
| 2007/0088137 A1 | 4/2007 | Georgeau et al. | |
| 2008/0269406 A1 * | 10/2008 | Bachon et al. | 524/588 |
| 2009/0025851 A1 * | 1/2009 | Huck | 156/60 |
| 2009/0075096 A1 * | 3/2009 | Butikofer et al. | 428/447 |
| 2009/0131591 A1 * | 5/2009 | Schindler et al. | 525/105 |
| 2009/0226740 A1 * | 9/2009 | Teysseire | 428/447 |
| 2011/0135943 A1 * | 6/2011 | Kinoshita et al. | 428/446 |

FOREIGN PATENT DOCUMENTS

| | | |
|---|---|---|
| WO | WO 03/018658 A1 | 3/2003 |
| WO | WO 2006/130592 A1 | 12/2006 |
| WO | WO 2007048538 A1 * | 5/2007 |
| WO | WO 2007/085620 A1 | 8/2007 |
| WO | WO 2007/085622 A1 | 8/2007 |

OTHER PUBLICATIONS

Wacker silicones technical data sheet for Geniosil STP-E 30, 2 pages, 2009.*
Wacker silicones technical data sheet for Geniosil STP-E 35, 2 pages, 2009.*
Kaneka technical data sheet for Kaneka MS S227, 1 page, 2011.*
International Preliminary Report on Patentability issued on Jun. 1, 2010 in corresponding International Application No. PCT/EP2008/062755 (with translation).
International Search Report mailed on Feb. 20, 2009 in corresponding International Application No. PCT/EP2008/062755 (with translation).

* cited by examiner

*Primary Examiner* — Robert S Loewe
(74) *Attorney, Agent, or Firm* — Oliff & Berridge, PLC

(57) ABSTRACT

The present invention relates to moisture-curing compositions that comprise, in addition to a first type of polymer having a specific end group, at least one additional type of polymer having a different specific end group. It has been shown that such compositions have a surprisingly quick adhesive formation and a low amount of seepage.

14 Claims, No Drawings

MOISTURE-CURING COMPOSITION COMPRISING AT LEAST TWO POLYMERS HAVING SILANE GROUPS

BACKGROUND

1. Technical Field

The present invention relates to the field of moisture-curing compositions, in particular the field of moisture-curing polymers containing silane functional groups (silane-functional polymers).

2. Prior Art

Moisture-curing compositions based on silane-functional polymers are known in the prior art, and are used inter alia as elastic adhesives, sealants, and coatings. They do not contain isocyanate groups and therefore from a toxicological viewpoint are preferred alternatives to isocyanate-containing polyurethane systems.

WO 03/018658 A1 describes silane-functional polymers with α-functional silane groups as end groups, which are distinguished by high reactivity and thus faster curing. WO 2007/085620 A1 also describes the use of silane-functional polymers with α-functional silane groups as end groups in adhesives and sealants having improved adhesion. However, such systems have a considerable tendency toward creep.

U.S. Pat. No. 3,971,751 and U.S. Pat. No. 6,207,766 describe silane-terminated polyether polymers which can be used in moisture-curing compositions. However, such systems firstly are very slow curing and sometimes possibly have a tendency toward creep. US 2006/0128919 A1 discloses that creep of such silane-terminated polyether polymers can be improved by addition of silicates or tin catalysts. Tin catalysts, however, are often undesirable for ecological and occupational safety reasons.

For example, U.S. Pat. No. 5,364,955 discloses compositions which contain silane-terminated polyurethane polymers. Development of adhesion in such systems, however, is very slow.

WO 2007/085622 A1 discloses in an Example an adhesive which, in addition to a polymer with α-functional silane groups, contains an extremely small amount of acrylate polymer with silane groups. However, this system tends toward creep. US 2007/0088137 discloses sprayable adhesives which contain a phenol resin as a tackifier and a polymer with hydrolyzable silicon end groups. The Examples of that patent include sprayable adhesives which, in addition to a phenol resin as a tackifier, also contain a dimethoxy(methyl)silylmethylcarbamate-terminated polyether as well as other silane-terminated polymers if needed.

WO 2006/130592 A1 discloses a polyurethane sealant which consists essentially of an isocyanate-terminated polyurethane prepolymer and only small amounts of a polymer with α-functional silane groups and an even smaller amount of a silane-terminated polyurethane polymer. Such sealants, however, have large amounts of isocyanate groups and are therefore undesirable from a toxicological standpoint.

DESCRIPTION OF THE INVENTION

The aim of the present invention is to provide moisture-curing compositions which are fast curing and have low creep and fast development of adhesion.

It was surprisingly discovered that this aim can be achieved by means of a composition as specified in Claim 1.

Namely it was shown that for this purpose, in addition to a first type of polymer (SP1) with a specific end group (Formula (I)), at least one more second type of polymer (SP2 and/or SP3) with another specific end group (Formula (II) and/or (III)) must be present in the composition. These compositions are quite suitable as adhesives and/or sealants with fast development of adhesion and low creep which are also fast curing.

Further aspects of the invention are the subject matter of other independent claims. Especially preferred embodiments of the invention are the subject matter of the dependent claims.

EMBODIMENTS OF THE INVENTION

The present invention relates in a first aspect to a moisture-curing composition which includes
at least one polymer SP1 with end groups of formula (I)

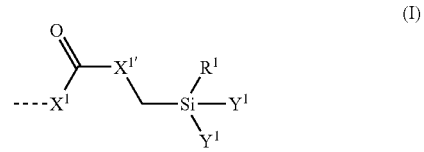

as well as either
at least one polymer SP2 with end groups of formula (II) and optionally at least one polymer SP3 with end groups of formula (III) not including urea groups or urethane groups;
or
at least one polymer SP3 with end groups of formula (III) not including urea groups or urethane groups;

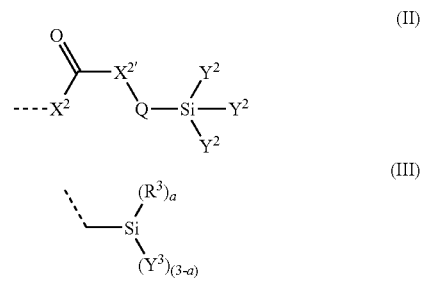

Here $X^1$, $X^{1'}$, $X^2$, and $X^{2'}$ each independently stand for O, S, or $NR^5$.

Q stands for a linear or branched alkylene residue with 3 to 6 C atoms.

Here $R^5$ stands for a hydrogen atom or for a linear or branched hydrocarbon residue with 1 to 20 C atoms, which optionally has cyclic moieties, and which optionally has at least one functional group selected from the group consisting of alkoxysilyl, ether, sulfone, nitrile, nitro, carboxylic acid ester, sulfonic acid ester, and phosphonic acid ester groups.

Furthermore, $R^1$ and $R^3$ each independently stand for an alkyl group with 1 to 10 C atoms, preferably a methyl group.

$Y^1$, $Y^2$, and $Y^3$ each independently stand for a hydrolyzable residue, in particular for an alkoxy group with 1 to 3 C atoms, and a stands for 0 or 1.

Furthermore, the proportions are as follows:
either
the weight ratio of polymer SP1 to polymer SP2 is a value between 0.1 and 0.8, in particular between 0.2 and 0.8
or
the weight ratio of polymer SP1 to polymer SP3 is a value between 0.1 and 0.8, in particular between 0.2 and 0.8;

and also if polymers SP2 and SP3 are simultaneously present in the composition, the weight ratio of polymer SP2 to polymer SP3 has a value >1.1, in particular >1.5.

In this document, the dashed lines in the formulas each represent binding of a group to the polymer.

It is especially preferred firstly for $X^{1'}$ and/or $X^2$ to stand for NH or secondly preferred for $X^{2'}$ to stand for $NR^5$.

In an especially preferred embodiment, $X^{2'}$ stands for

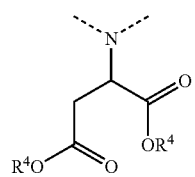

where $R^4$ stands for methyl, ethyl, propyl, or butyl.

In this document, the term "polymer" firstly includes a group of chemically uniform macromolecules which however have different degrees of polymerization, molecular weights, and chain lengths, that have been synthesized by means of a polyreaction (polymerization, polyaddition, polycondensation). The term secondly includes derivatives of such a group of macromolecules from polyreactions, and therefore compounds that have been obtained by reactions (such as addition or substitution) involving functional groups on the specified macromolecules and that can be chemically uniform or chemically nonuniform. The term furthermore also includes "prepolymers", i.e., reactive oligomeric pre-adducts with functional groups that take part in synthesis of the macromolecules.

In this document, the term "silane" means organoalkoxysilanes, i.e., compounds in which first of all at least one, usually two or three alkoxy groups are bonded directly to the silicon atom (through an Si—O bond) and that secondly have at least one organic residue directly bonded to the silicon atom (through an Si—C bond). Accordingly, the term "silane group" means the silicon-containing group bonded to the organic residue of an organoalkoxysilane. The silanes, or their silane groups, have the property that they undergo hydrolysis when in contact with moisture. Organosilanols are thus formed, i.e., organosilicon compounds containing one or more silanol groups (Si—OH groups) and, by means of subsequent condensation reactions, organosiloxanes are formed, i.e., organosilicon compounds containing one or more siloxane groups (Si—O—Si groups). The term "silane-functional" means compounds, in particular polymers, which have silane groups.

The term "α-functional" means silanes or silane groups for which the organic residue is substituted by a functional group, for example an isocyanate group or an amino group, in the α position (the 1 position) relative to the silicon atom.

Accordingly silanes or silane groups are called "γ-functional" if their organic residue is substituted by a functional group in the γ position (the 3 position) relative to the silicon atom.

Silane names with functional groups as prefixes, such as "aminosilane" or "isocyanatosilane," for example, mean silanes bearing the indicated functional groups on the organic residue as substituents. Names such as "α-aminosilane" or "γ-aminosilane," for example, mean that the indicated functional groups are in a specific position relative to the silicon atom.

The term "polyurethane polymer" includes all polymers which are synthesized by the diisocyanate polyaddition method. This also includes such polymers that are nearly or entirely free of urethane groups. Examples of polyurethane polymers are polyether polyurethanes, polyester polyurethanes, polyether polyureas, polyureas, polyester polyureas, polyisocyanurates or polycarbodiimides.

The composition absolutely must have at least one polymer SP1 with end groups of formula (I). Suitable polymers SP1 are, for example, described in WO 03/018658, and their disclosure is incorporated herewith. These polymers contain α-functional silane groups as end groups, which because of their electronic structure have the property of very rapidly undergoing hydrolysis and then condensation. Such polymers thus have very high reactivity relative to moisture. They can therefore be used to prepare moisture-curing compositions that also have fast curing rates without or with only small amounts of catalysts, in particular metal catalysts.

In principle, they can be prepared in different ways.

In a first variant (Var. I) of the preparation of polymer SP1, α-silanes having an NCO-reactive group are reacted with a polymer containing NCO groups. Polymers of formula (IVa) can be formed in particular in this way:

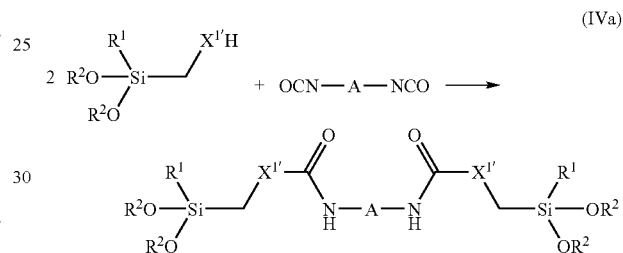

(IVa)

Here A represents a divalent residue of an isocyanate-group containing polymer after removal of two NCO groups.

α-Silanes which have NCO-reactive groups include α-aminosilanes or α-mercaptosilanes.

Particularly suitable as α-aminosilanes for reaction with an isocyanate-group containing polymer are α-aminosilanes with a primary amino group ($NH_2$ group), also called "primary α-aminosilanes" in the following, such as (aminomethyl)methyldimethoxysilane; α-aminosilanes with a secondary amino group (NH group), also called "secondary α-aminosilanes" in the following, such as analogs of the indicated primary α-aminosilanes bearing a hydrocarbon residue on the oxygen atom, for example a methyl, ethyl, butyl, cyclohexyl, or phenyl group, such as for example, (N-cyclohexylaminomethyl)methyldimethoxysilane or (N-phenylaminomethyl) methyldimethoxysilane; secondary α-aminosilanes with multiple silane functional groups such as, for example, bis(methyldimethoxysilylmethyl)amine; as well as the products of Michael addition of the indicated primary α-aminosilanes to Michael acceptors such as maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic aryl esters, vinylsulfones, vinylnitriles, 1-nitroethylenes or Knoevenagel condensation products such as, for example, those formed from malonic acid diesters and aldehydes such as formaldehyde, acetaldehyde, or benzaldehyde; as well as the analogs of all the indicated α-aminosilanes with ethoxy or isopropoxy groups instead of methoxy groups on the silicon atom.

Among the indicated products of Michael addition, we should particularly mention the reaction products of primary α-aminosilanes reacted with maleic acid dimethyl, diethyl, or dibutyl ester, acrylic acid tetrahydrofurfuryl, isobornyl, hexyl, lauryl, stearyl, 2-hydroxyethyl, or 3-hydroxypropyl ester, phosphonic acid dimethyl, diethyl, or dibutyl ester, acrylonitrile, 2-pentenenitrile, fumaronitrile, or β-nitrostyrene.

Suitable α-mercaptosilanes for reaction with an isocyanate-group containing polymer include, for example, (mercaptomethyl)methyldimethoxysilane, (mercaptomethyl)ethyldimethoxysilane, or (mercaptomethyl) butyldimethoxysilane, as well as their analogs with ethoxy or isopropoxy groups instead of methoxy groups on the silicon atom.

In a second variant (Var. II) for preparation of polymer SP1, α-silanes having NCO groups are reacted with polymers containing NCO-reactive groups. Polymers of formula (IVb) can be formed in particular in this way:

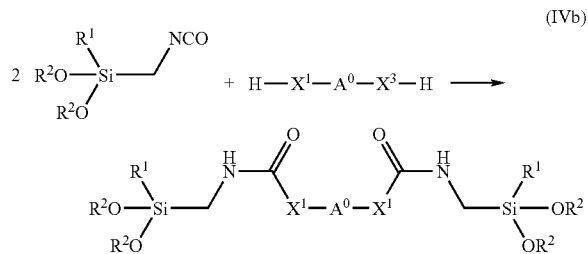

(IVb)

Here $A^0$ represents a divalent residue of an isocyanate-group reactive polymer after removal of two NCO-reactive groups $HX^1$.

α-Isocyanatosilanes are particularly suitable as the α-silanes having NCO groups, such as, for example, (isocyanatomethyl)methyldimethoxysilane, (isocyanatomethyl) ethyldimethoxysilane, or (isocyanatomethyl) butyldimethoxysilane, as well as their analogs with ethoxy or isopropoxy groups instead of methoxy groups on the silicon atom. Preferred α-isocyanatosilanes are (isocyanatomethyl) methyldimethoxysilane and (isocyanatomethyl)methyldiethoxysilane.

It is clear to the person skilled in the art that in both variants (Var. I and Var. II), the respective silane should be used in a stoichiometric amount or in a slight stoichiometric excess in order to achieve the highest possible yield of the desired product of formula (IVa) or (IVb).

Polymers of formula (IV) are especially preferred as polymers SP1:

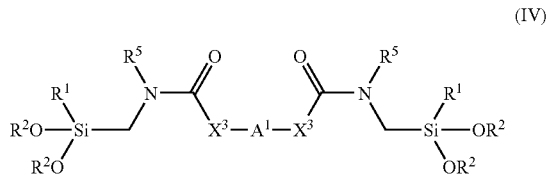

(IV)

Here $X^3$ stands for O or NH or $NR^{5'}$, where $R^{5'}$ stands for a linear or branched hydrocarbon residue with 1 to 20 C atoms.

Furthermore, $R^2$ stands for an alkyl group with 1 to 5 C atoms, in particular for a methyl group or an ethyl group or an isopropyl group, and $A^1$ stands for a divalent residue of a polymeric diol or polymeric diamine after removal of hydroxyl groups or amino groups.

$R^1$ and $R^5$ have been already defined above.

Polymers of formula (IV) can be prepared according to methods (Var. I) or (Var. II), depending on the meaning of the residue $R^5$ and $X^3$.

The aforementioned residues A, $A^0$, and $A^1$ are of different types. For example, they can come from NCO- or $X^1$H- or $X^3$H-functional hydrocarbons such as, for example, from the corresponding functionalized polybutadienes, or completely or partially hydrogenated polybutadienes, or NCO- or $X^1$H- or $X^3$H-functional polyacrylates, or NCO- or $X^1$H- or $X^3$H-functional polyurethane polymers, or NCO- or $X^1$H- or $X^3$H-functional polyoxyalkylene polymers.

In a preferred embodiment, the polymeric diol or polymeric diamine which is the basis for residue $A^1$ is an isocyanate-group containing polyurethane polymer P1.

The isocyanate-group containing polymer P1 can be obtained, for example, by reaction of at least one polyol with at least one polyisocyanate, in particular a diisocyanate. This reaction can be carried out in such a way that the polyol and the polyisocyanate are reacted by a conventional procedure, for example at temperatures from 50° C. to 100° C., optionally using suitable catalysts, where the polyisocyanate is measured out so that its isocyanate groups are present in stoichiometric excess relative to the hydroxyl groups of the polyol.

For example, the following commercially available polyols or any mixtures thereof can be used as the polyols to make the isocyanate-group containing polyurethane polymer P1:

Polyoxyalkylene polyols, also called polyether polyols or oligoetherols, which are polymerization products of ethylene oxide, 1,2-propylene oxide, 1,2- or 2,3-butylene oxide, tetrahydrofuran or mixtures thereof, optionally polymerized using an initiator molecule with two or more active hydrogen atoms such as, for example, water, ammonia, or compounds with several OH or NH groups such as, for example, 1,2-ethanediol, 1,2- and 1,3-propanediol, neopentyl glycol, diethylene glycol, triethylene glycol and polyethylene glycols, the isomeric dipropylene glycols, tripropylene glycols, and polypropylene glycols, the isomeric butanediols, pentanediols, hexanediols, heptanediols, octanediols, nonanediols, decanediols, and undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the aforementioned compounds. Polyoxyalkylene polyols also can be used that have a low degree of unsaturation (measured according to ASTM D-2849-69 and expressed in milliequivalents of unsaturation per gram polyol (meq/g)), synthesized for example using "double metal cyanide complex catalysts" (DMC catalysts), as well as polyoxyalkylene polyols with a higher degree of unsaturation, synthesized for example using anionic catalysts such as NaOH, KOH, CsOH, or alkali metal alkoxides.

Polyoxyalkylene diols or polyoxyalkylene triols, in particular polyoxypropylene diols or polyoxypropylene triols, are especially suitable.

Especially suitable polyoxyalkylene diols or polyoxyalkylene trials are those which have a degree of unsaturation below 0.02 meq/g and a molecular weight in the range from 1000 to 30 000 g/mol, as well as polyoxypropylene diols and trials with a molecular weight from 4000 to 25 000 g/mol. In this document, the term "molecular weight" means the average molecular weight $M_n$.

Also especially suitable are "ethylene oxide-terminated" ("EO-endcapped", ethylene oxide-endcapped) polyoxypropylene polyols. The latter are special polyoxypropylene polyoxyethylene polyols that, for example, can be obtained by further alkoxylating pure polyoxypropylene polyols, in particular polyoxypropylene diols and triols, after completion of polypropoxylation, with ethylene oxide and thus they have primary hydroxyl groups.

Styrene-acrylonitrile-grafted or acrylonitrile-methylmethacrylate-grafted polyether polyols.

Polyester polyols, also called oligoesterols, synthesized for example from dihydric or trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols, reacted with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, as well as polyester polyols derived from lactones such as, for example, $\epsilon$-caprolactone.

Polycarbonate polyols, as can be obtained, for example, by reaction of the above-indicated alcohols (used to synthesize the polyester polyols) with dialkyl carbonates, diaryl carbonates, or phosgene.

Polyacrylate and polymethacrylate polyols.

Polyhydrocarbon polyols, also called oligohydrocarbonols, such as for example polyhydroxy-functional ethylene/propylene, ethylene/butylene, or ethylene/propylene diene copolymers, such as, for example, are produced by Kraton, or polyhydroxy-functional copolymers derived from dienes such as 1,3-butanediene or diene mixtures and vinyl monomers such as styrene, acrylonitrile, or isobutylene, or polyhydroxy-functional polybutadiene polyols such as, for example, those prepared by copolymerization of 1,3-butadiene and allyl alcohol.

Polyhydroxy-functional acrylonitrile/polybutadiene copolymers, such as can be synthesized, for example, from epoxides or amino alcohols and carboxyl-terminated acrylonitrile/polybutadiene copolymers (commercially available under the name Hycar® CTBN from Hanse Chemie).

These indicated polyols have an average molecular weight from 250 to 30 000 g/mol, in particular from 1000 to 30 000 g/mol, and an average number of OH functional groups in the range from 1.6 to 3.

Polyoxyalkylene polyols are preferred as the polyols. Furthermore, dials are preferred as the polyols. Especially preferred are polyoxyalkylene dials, in particular those which have a degree of unsaturation below 0.02 meq/g and a molecular weight in the range from 4000 to 30 000 g/mol, in particular 8000 to 30 000 g/mol.

For example, the following commercially available polyisocyanates can be used as the polyisocyanates to make an isocyanate-group containing polyurethane polymer P1:

1,6-hexamethylene diisocyanate (HDI), 2-methylpentamethylene-1,5-diisocyanate, 2,2,4- and 2,4,4-trimethyl-1,6-hexamethylene diisocyanate (TMDI), 1,12-dodecamethylene diisocyanate, lysine and lysine ester diisocyanate, cyclohexane-1,3- and -1,4-diisocyanate and any mixture of these isomers, 1-isocyanato-3,3,5-trimethyl-5-isocyanatomethylcyclohexane isophorone diisocyanate or IPDI), perhydro-2,4'- and -4,4'-diphenylmethane diisocyanate (HMDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and -1,4-xylylene diisocyanate (m- and p-TMXDI), bis(1-isocyanato-1-methylethyl)naphthalene, 2,4- and 2,6-toluoylene diisocyanate, 2,4- and 2,6-toluoylene diisocyanate and any mixture of these isomers (TDI), 4,4'-, 2,4', and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TORI), oligomers and polymers of the aforementioned isocyanates, as well as any mixtures of the aforementioned isocyanates. MDI, TDI, HDI, and IPDI are preferred.

Especially preferred as polymer SP1 are polymers with end groups of formula (IV) in which the polymeric diol or polymeric diamine which is the basis for residue $A^1$ is a polyoxyalkylene diol, in particular a polyoxyalkylene diol with a degree of unsaturation below 0.02 meq/g, preferably with a molecular weight between 4000 and 30 000 g/mol, in particular between 8000 and 30 000 g/mol. Especially suitable polyoxyalkylene diols that have a low degree of unsaturation (measured according to ASTM D-2849-69 and expressed in milliequivalents of unsaturation per gram polyol (meq/g)) can be synthesized, for example, using "double metal cyanide complex catalysts" (DMC catalysts) such as, for example, those marketed by Bayer under the trade name Acclaim®.

The polymeric diamines are in particular ether-group containing aliphatic diamines such as, for example, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine and higher oligomers of these diamines, bis(3-aminopropyl)polytetrahydrofurans and other polytetrahydrofuran diamines with molecular weights in the range, for example, from 350 to 5200, as well as polyoxyalkylene diamines. The latter are typically amination products of polyoxyalkylene diols and can be obtained, for example, under the name Jeffamine® (from Huntsman Chemicals), under the name polyetheramine (from BASF) or under the name PC Amine® (from Nitroil).

Particularly suitable polymeric diamines are polyoxyalkylene diamines such as Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559; polyetheramine D 230, polyetheramine D 400 and polyetheramine D 2000, PC Amine® DA 250, PC Amine® DA 400, PC Amine® DA 650, and PC Amine® DA 2000.

The moisture-curing composition contains at least one polymer SP2 with end groups of formula (II) and/or a polymer SP3 with end groups of formula of formula [sic] (III). The polymers SP2 can be prepared in different ways:

In a first variant (Var. I') for preparation of polymer SP2, the corresponding silanes, in particular γ-silanes, having an NCO-reactive group are reacted with a polymer containing NCO groups. Polymers of formula (V) can be formed in particular this way:

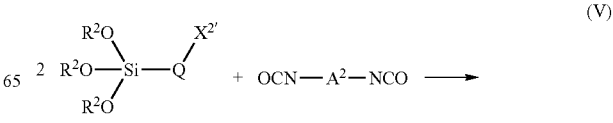

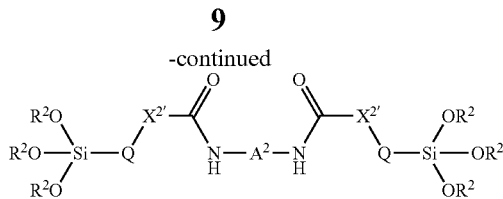

Here $A^2$ represents a divalent residue of an isocyanate-group containing polymer which can be prepared from reaction of at least one diisocyanate with at least one diamine and/or diol, after removal of isocyanate groups. The residues $R^2$ and $X^{2'}$ have been already defined above.

γ-Silanes having NCO-reactive groups include γ-aminosilanes or γ-mercaptosilanes.

Particularly suitable as γ-aminosilanes for reaction with an isocyanate-group containing polymer are:

- γ-aminosilanes with a primary amino group ($NH_2$ group), also called "primary γ-aminosilanes" in the following, such as 3-aminopropyltrimethoxysilane, 3-amino-2-methylpropyltrimethoxysilane, and 3-amino-2,2-dimethylpropyltrimethoxysilane,
- γ-aminosilanes with a secondary amino group (NH group), also called "secondary γ-aminosilanes" in the following, for example analogs of the indicated primary γ-aminosilanes, such as analogs of the indicated primary α-aminosilanes bearing a hydrocarbon residue on the oxygen atom, for example, a methyl, ethyl, butyl, cyclohexyl, or phenyl group, such as, for example, (N-cyclohexylaminopropyl)trimethoxysilane or (N-phenylaminopropyl)trimethoxysilane; secondary α-aminosilanes with multiple silane functional groups such as, for example, bis(trimethoxysilylmethyl)amine.
- as well as the products of Michael addition of the indicated primary α-aminosilanes to Michael acceptors such as maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic aryl esters, vinylsulfones, vinylnitriles, 1-nitroethylenes or Knoevenagel condensation products such as, for example, those formed from malonic acid diesters and aldehydes such as formaldehyde, acetaldehyde, or benzaldehyde; as well as the analogs of all the indicated γ-aminosilanes with ethoxy or isopropoxy groups instead of methoxy groups on the silicon atom.

Among the indicated Michael addition products, we should particularly mention the reaction products of primary γ-aminosilanes reacted with maleic acid dimethyl, diethyl, or dibutyl ester, acrylic acid tetrahydrofurfuryl, isobornyl, hexyl, lauryl, stearyl, 2-hydroxyethyl, or 3-hydroxypropyl ester, phosphonic acid dimethyl, diethyl, or dibutyl ester, acrylonitrile, 2-pentenenitrile, fumaronitrile or β-nitrostyrene.

Suitable α-mercaptosilanes for reaction with an isocyanate-group containing polymer include, for example, (3-mercaptopropyl)trimethoxysilane, as well as their analogs with ethoxy or isopropoxy groups instead of methoxy groups on the silicon atom.

Further especially suitable aminosilanes are, for example, 4-amino-3,3-dimethylbutyltrimethoxysilane and 4-amino-3-methylbutyltrimethoxysilane, their alkylation products, the products of Michael addition of these primary aminosilanes to Michael acceptors such as maleic acid diesters, fumaric acid diesters, citraconic acid diesters, acrylic acid esters, methacrylic acid esters, cinnamic acid esters, itaconic acid diesters, vinylphosphonic acid diesters, vinylsulfonic aryl esters, vinylsulfones, vinylnitriles, 1-nitroethylenes, or Knoevenagel condensation products such as, for example, those formed from malonic acid diesters and aldehydes such as formaldehyde, acetaldehyde, or benzaldehyde; as well as the analogs of all the indicated aminosilanes with ethoxy or isopropoxy groups instead of methoxy groups on the silicon atom.

In a second variant (Var. II') for preparation of polymer SP2, the corresponding silanes, in particular γ-silanes having NCO groups, are reacted with polymers containing NCO-reactive groups. Polymers of formula (Vb) can be formed in particular in this way:

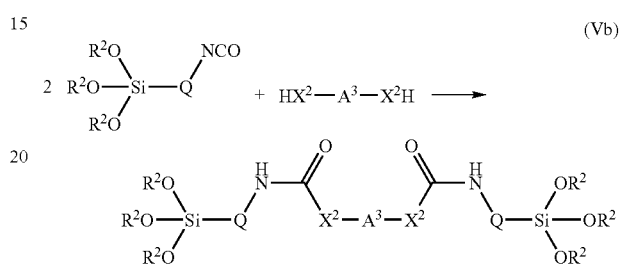

Here $A^3$ represents a divalent residue of a polymer with NCO-reactive groups after removal of NCO-reactive groups $HX^2$.

Suitable γ-silanes having NCO groups include in particular γ-isocyanatosilanes such as, for example, (isocyanatopropyl)trimethoxysilane, (isocyanatopropyl)triethoxysilane, as well as their analogs with isopropoxy groups instead of methoxy groups on the silicon atom.

In formulas (II), (V), and (Vb), the residue Q preferably stands for a residue selected from the group consisting of

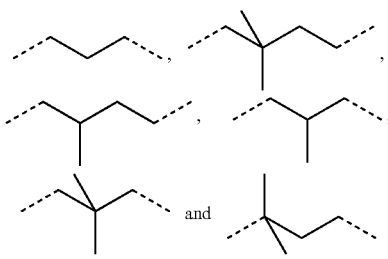

most preferably 1,3-propylene.

The moisture-curing composition contains at least one polymer SP2 with end groups of formula (II) and/or a polymer SP3 with end groups of formula (III) which do not contain urea groups or urethane groups. The polymer SP3 with end groups of formula (III) can be prepared in particular by hydrosilylation of polymers or polyether polymers with terminal double bonds, for example poly(meth)acrylate polymers or polyether polymers with terminal double bonds, in particular allyl-terminated polyoxyalkylene polymers. Such polymers SP3 are described, for example, in U.S. Pat. No. 3,971,751 and U.S. Pat. No. 6,207,766 and their disclosure is included herewith. Polymers SP3 are known to the person skilled in art, in particular under the name "MS polymers." Examples of commercially available polymers SP3 with end groups of formula (III) are the products with trade names MS-Polymer® S203(H), S303(H), S227, S810, MA903, and S943, Silyl® SAX220, SAX350, SAX400, and SAX725, Silyl® SAT350 and SAT400, as well as XMAP® SA100S and SA310S (all from Kaneko); as well as Excestar® S2410, S2420, S3430, S3630, W2450, and MSX931 (all from Asahi Glass).

The composition must contain at least one polymer SP1 with end groups of formula (I). The composition must furthermore contain at least one polymer SP2 with end groups of formula (II) or at least one polymer SP3 with end groups of formula (III).

In one embodiment of the invention, the composition contains at least one polymer SP1 with end groups of formula (I) and at least one polymer SP2 with end groups of formula (II). In particular, such a composition has no polymer SP3 with end groups of formula (III).

In a further embodiment of the invention, the composition contains at least one polymer SP1 with end groups of formula (I) and at least one polymer SP3 with end groups of formula (III). In particular, such a composition has no polymer SP2 with end groups of formula (II).

In a further embodiment of the invention, the composition contains at least one polymer SP1 with end groups of formula (I) and at least one polymer SP2 with end groups of formula (II) and at least one polymer SP3 with end groups of formula (III).

Especially preferred compositions are those having at least one polymer SP2 with end groups of formula (II).

Compositions are most preferred that contain only at least one polymer SP1 with end groups of formula (I) and at least one polymer SP2 with end groups of formula (II) as moisture-curing polymers. Such compositions in particular do not contain polymers SP3 with end groups of formula (III).

The weight ratio of polymer SP1 to polymer SP2 is a value between 0.1 and 0.8, in particular between 0.2 and 0.8.

The weight ratio of polymer SP1 to polymer SP3 is a value between 0.1 and 0.8, in particular between 0.2 and 0.8.

If the weight ratios SP1/SP2 are greater than 0.8, then the composition has an increased tendency toward creep under load, which increases with an increasing proportion of polymer SP1.

It has been shown that the upper limit for this ratio in practice is 0.8. If this ratio is smaller than 0.1, then the adhesion is considerably impaired. It has been shown that a ratio SP1/SP2 or SP1/SP3 between 0.2 and 0.8 gives the composition an especially good balance of properties. This ratio is optimally between 0.3 and 0.6, in particular between 0.35 and 0.5. Furthermore, it has been shown that for a weight ratio SP1/SP2 or SP1/SP3 of more than 0.8, in particular more than 1, such systems tend to react too fast because of the very high reactivity of polymer SP1, which then again can result in reduced storage stability.

If the composition simultaneously contains both polymer SP2 and polymer SP3, the weight ratio of polymer SP2 to polymer SP3 has a value >1.1, in particular >1.5.

It was found that if a combination of both polymer SP2 and polymer SP3 is used, then a too high proportion of polymer SP3 has a negative effect on creep behavior. It has now been shown that when SP2 and SP3 are simultaneously present, a ratio SP2/SP3 must be maintained that at least keeps creep within limits that are acceptable in practice.

Furthermore, the proportion of polymer SP1 with end groups of formula (I) in the composition is preferably 2-45 wt. %, in particular 5-35 wt. %.

Furthermore, the sum of the proportions of polymer SP2 and/or polymer SP3 in the composition is preferably 10-70 wt. %.

The composition can contain other components as needed.

The following aids and additives inter alia can be present as additional components:

plasticizers, for example esters of organic carboxylic acids or their anhydrides, such as phthalates, for example dioctylphthalate, diisononylphthalate, or diisodecylphthalate, adipates such as, for example, dioctyladipate, azelates and sebacates, polyols such as, for example, polyoxyalkylene polyols or polyester polyols, organic phosphoric and sulfonic acid esters or polybutenes;
  solvents;
  inorganic and organic fillers such as, for example, ground or precipitated calcium carbonates which optionally are coated with stearates, in particular finely divided coated calcium carbonate, carbon blacks, in particular industrially produced carbon blacks (called "carbon black" in the following), kaolins, aluminum oxides, silicic acids, in particular highly dispersed pyrogenic silicic acids, PVC powder or hollow spheres.
  Preferred fillers are carbon black, calcium carbonates, in particular finely divided coated calcium carbonates, highly dispersed pyrogenic silicic acids, as well as combinations of these fillers.
  fibers, for example polyethylene fibers;
  pigments; for example, titanium dioxide;
  catalysts, for example metal catalysts in the form of organotin compounds such as dibutyltin dilaurate and dibutyltin diacetylacetonate, organobismuth compounds or bismuth complexes;
    titanates such as, for example, isopropyltriisostearoyl titanate, isopropyltri(dodecyl)benzenesulfonyl titanate, isopropyltri(N-ethylenediamino)ethyl titanate, titanium diethyl acetoacetate, and combinations of different metal catalysts;
    compounds containing amino groups, for example 1,4-diazabicyclo[2.2.2]octane and 2,2'-dimorpholinodiethyl ether,
    as well as combinations thereof;
  rheology modifiers such as, for example, thickeners, for example urea compounds, polyamide waxes, bentonites, or pyrogenic silicic acids;
  adhesion promoters, in particular aminosilanes, preferably an aminosilane selected from the group consisting of 3-aminopropyltrimethoxysilane, 3-aminopropyldimethoxymethylsilane, 3-amino-2-methylpropyltrimethoxysilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, as well as their analogs with ethoxy or isopropoxy groups instead of methoxy groups on the silicon atom;
  N-(2-aminoethyl)-3-aminopropylsilanes such as N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, and N-(2-aminoethyl)-3-aminopropyltriisopropoxysilane;
  N-(2-aminoethyl)-N'-[3-(trimethoxysilyl)propyl]ethylenediamine;
  N-butyl-3-aminopropyltrimethoxysilane, N-phenyl-3-aminopropyltrimethoxysilane;
  adducts from Michael addition of primary aminosilanes, in particular 3-aminopropyltrimethoxysilane or 3-aminopropyldimethoxymethylsilane, to Michael acceptors such as acrylonitrile, acrylic and methacrylic acid esters, acrylic or methacrylic acid amides, maleic acid and fumaric acid diesters, citraconic acid diesters, and itaconic acid diesters, preferably N-(3-trimethoxysilylpropyl)aminosuccinic acid dimethyl and diethyl esters;

other adhesion promoters, for example epoxysilanes, (meth)acrylosilanes, preferably (3-methacryloxypropyetrimethoxysilane, (3-methacryloxypropyl)triethoxysilane, or (3-methacryloxypropyl)triisopropoxysilane, anhydride silanes, preferably 3-(trimethoxysilyl)propyl succinic acid anhydride or 3-(triethoxysilyl)propyl succinic acid anhydride, in particular 3-(triethoxysilyl)propyl succinic acid anhydride, or adducts of epoxysilanes, (meth)acrylosilanes, anhydride silanes and primary aminosilanes, as well as urea silanes;

crosslinkers, for example silane-functional oligomers and polymers;

drying agents, for example vinyltrimethoxysilane, α-functional silanes such as N-(silylmethyl)-O-methylcarbamate, in particular N-(methyldimethoxysilylmethyl)-β-methylcarbamate, (methacryloxymethyl)silane, methoxymethylsilane, N-phenyl-, N-cyclohexyl-, and N-alkylsilanes, orthoformic acid esters, calcium oxide, or molecular sieves;

heat, light, and UV radiation stabilizers;

flame retardants;

surfactants such as, for example, wetting agents, flow-control agents, degassers or defoamers;

biocides such as, for example, algicides, fungicides, or mold growth inhibitors;

as well as other substances conventionally used in moisture-curing compositions.

The composition preferably contains no free isocyanate groups. Such an isocyanate-free composition is advantageous from a toxicological standpoint.

It is advantageous to make sure that these additional components do not negatively affect the storage stability of the composition, i.e., during storage, the reaction of the silane groups contained in the composition leading to crosslinking must not be initiated to a significant extent. This means in particular that such additional components preferably do not contain any water, or at most contain traces of water. It can be expedient to chemically or physically dry certain components before mixing into the composition.

The composition especially preferably further contains, in addition to polymer SP1 and polymer SP2 and/or polymer SP3:

20-50 wt. % filler, preferably selected from the group including chalk, carbon black, and pyrogenic silicic acid, the most preferred are mixtures of chalk and/or carbon black and/or pyrogenic silicic acid, 0.1-10 wt. % organosilane, 0.01-2 wt. % catalyst, in particular a tin catalyst, and 0-20 wt. % plasticizer, in particular phthalates.

As organosilanes, we mean in particular the aminosilanes, epoxysilanes, (meth)acrylosilanes, anhydride silanes, adducts of epoxysilanes, (meth)acrylosilanes, anhydride silanes, and primary aminosilanes, urea silanes indicated above as adhesion promoters, as well as silanes indicated as drying agents.

The described moisture-curing composition is stored away from moisture. It is stable in storage, i.e., it can be stored away from moisture in suitable packaging or devices, such as for example in a drum, a bag, or a cartridge, for a period of several months up to a year or longer, without alteration of its application properties or properties after curing to an extent relevant for its use. Usually the storage stability is determined by measuring the viscosity, the extruded amount, or the extrusion force.

During application of the described moisture-curing composition to at least one solid or article, the silane groups of the polymer and the silanes come in contact with moisture. The silane groups have the property that they undergo hydrolysis when in contact with moisture. Organosilanols are thus formed (organosilicon compounds containing one or more silanol groups, Si—OH groups) and, by means of subsequent condensation reactions, organosiloxanes are formed (organosilicon compounds containing one or more siloxane groups, Si—O—Si groups). As a result of these reactions, which can be accelerated by use of catalysts, the composition ultimately cures; this process is also called crosslinking. The water needed for the curing reaction can either come from the air (air humidity) or else the composition can be brought into contact with a water-containing component, for example by coating, for example with a tooling agent, or by spraying, or a water-containing component can be added to the composition during application, for example in the form of a water-containing paste that is mixed into it, for example, using a static mixer.

The described composition cures rapidly when in contact with moisture. In the cured state, it has high mechanical strength and good creep behavior. Furthermore, adhesion and strength develop very rapidly.

Thus the cured compositions, which are obtained by means of reaction of a moisture-curing composition described above with water, in particular in the form of air humidity or by adding a water-containing paste, represent a further aspect of the present invention.

The above-described moisture-curing compositions are used in particular as adhesives, sealants, potting compounds, or coatings.

Suitable applications, for example, are bonding components used in civil engineering and in manufacture or repair of industrial goods or consumer goods, in particular windows, household appliances or means of transport such as water or land vehicles, preferably automobiles, busses, freight vehicles, trains, or ships; sealing joints, seams, or cavities in industrial manufacture or repair, or in civil engineering; as well as coating various substrates, for example as paint, lacquer, primer, seal or protective coating, or as floor covering, for example for offices, living areas, health care facilities, schools, warehouses, and parking garages.

A method for bonding a substrate S1 to a substrate S2 includes the following steps:

i) Application of a moisture-curing composition described above to a substrate S1;

ii) Bringing the applied composition into contact with a substrate S2 within the open time of the composition; or i') Application of a moisture-curing composition described above to a substrate S1 and to a substrate S2;

ii') Bringing the applied compositions into contact with each other within the open time of the composition.

Substrate S2 here consists of material which is the same as or different from S1.

A method for sealing includes the step i") Application of a moisture-curing composition described above to a joint formed by the surfaces or part of the surfaces of substrate S1 and substrate S2, where substrate S2 consists of material which is the same as or different from substrate S1 or where substrate S1 and substrate S2 form one piece.

The adhesive or sealant is preferably applied uniformly.

Suitable substrates S1 or S2 are, for example, inorganic substrates such as glass, glass ceramic, concrete, mortar, brick, tile, plaster, and natural stones such as granite or marble; metals or alloys such as aluminum, steel, nonferrous metals, galvanized metals; organic substrates such as wood, plastics such as PVC, polycarbonates, PMMA, polyesters, epoxy resins; coated substrates such as powder-coated metals or alloys; as well as paints and lacquers, in particular automotive topcoats.

As needed, the substrates can be pretreated before applying the adhesive or sealant. Such pretreatments in particular include physical and/or chemical cleaning methods, for example grinding, sand blasting, brushing, or the like, or treatment with cleaning agents or solvents, or applying an adhesion promoter, an adhesion promoter solution, or a primer.

By using one of the methods described above for bonding or one of the methods described above for sealing, a bonded or sealed article is obtained. Such an article can be a structure, in particular a civil engineering structure, or a means of transport or a mounted part on a means of transport or an article of the furniture, textile, or packaging industry.

The preferred article is a means of transport, for example a water or land vehicle, in particular an automobile, a bus, a freight vehicle, a train, or a ship, or a mounted part thereon. The bonded or sealed article is especially preferably a means of transport, in particular an automobile, bus, train, or freight vehicle, or a mounted part on a means of transport, in particular on an automobile.

If the composition is used as an adhesive for elastic bonding in automotive assembly, it preferably has a pasty consistency with shear-thinning properties. Such an adhesive is applied to the substrate using a suitable device, preferably in the form of a bead, where the bead can have an essentially round or triangular cross section. Suitable methods for applying the adhesive are, for example, application from a standard cartridge which is operated manually or using compressed air, or from a drum or hobbock using a feed pump or an extruder, optionally using an application robot. An adhesive with good application properties has high stability and short cut-off string. That is, after application it stays in the applied form, therefore it does not flow apart, and there is no cut-off string or only a very short cut-off string when the application device is withdrawn, so there is no mess left on the substrate.

Elastic bonding in automotive assembly involves, for example, adhesion of parts such as plastic covers, trim, flanges, fenders, driver's cabs or other mounted parts to the lacquered body of a means of transport, or bonding of panes to the body. As vehicles we should mention, for example, automobiles, freight vehicles, buses, track vehicles, and ships.

EXAMPLES

Test methods

In order to study creep behavior, a single-lap tensile shear test piece was prepared with the adhesives and aluminum sheets (cleaned with isopropanol) (bonding surface area: 25×12 mm, thickness 4 mm).

After complete curing, the test piece was loaded either with 0.1 MPa or with 3.5% of the maximum tensile shear force at 23° C. and 50% RH (relative air humidity). Deformation of the test piece was recorded for 300 h using a mechanical gauge, and is given in Table 1 as the percentage change in the measured value relative to the beginning of the measurements.

To determine the early adhesion, a glass plate was cleaned with isopropanol. Then an adhesive bead (approx. 1.5 cm wide, 0.5 cm high) was applied. After 4 and 8 hours, the adhesion of the skin formed by that point was tested as follows: the cured beads were each cut at one end just above the surface of the plate (bonding surface). The cut end of the bead was held by hand and then carefully and slowly pulled away from the surface of the plate, peeling in the direction toward the other end of the bead. If the adhesion to the plate was so strong that the end of the bead threatened to tear off while pulling, a cutter was used to make a cut perpendicular to the direction in which the bead was pulled, down to the bare surface of the plate, and thus a bit of the bead was removed. Such cuts were repeated when necessary at intervals of 2 to 3 mm while pulling. In this way, the entire bead was pulled or cut from the plate. The adhesive properties were evaluated based on the cured composition remaining on the substrate surface after the bead was pulled off (cohesive failure), or more precisely by estimating the area fraction of cohesive failure. In the test results in Table 1, the area fraction of cohesive failure is given in percent of the total bonding surface area of the already cured material. A higher area fraction of cohesive failure thus corresponds to higher early adhesion.

The tensile strength and elongation were determined using the dumbbell tensile test according to DIN 53 504, the tensile shear strength was determined according to DIN EN 1465.

In order to measure the tack-free time (the time required to form a skin, or before bonding occurs), a few grams of the composition in a layer thickness of approximately 2 mm were applied to cardboard, and in the standard climate (23° C.±1° C. and 50%±5% relative air humidity), the time elapsed was measured to the point when lightly tapping the surface of the composition with an LDPE pipet first left no more residue on the pipet.

Polymers

Polymers 1

Geniosil® STP-E10 ("STP-E10")

Geniosil® STP-E30 ("STP-E30")

Both polymers are silane-terminated polyethers with dimethoxy(methyl)silylmethylcarbamate end groups and can be obtained from Wacker Chemie AG, Munich, Germany.

Polymer 2

Under a nitrogen atmosphere, 1000 g Polyol Acclaim® 12200 (Bayer AG; low monol polyoxypropylenediol; OH value 11.0 mg KOH/g; water content approx. 0.02 wt. %), 43.6 g isophorone diisocyanate (IPDI; Vestanat® IPDI, Evonik Degussa), 126.4 g diisodecylphthalate (DIDP; Palatinol® Z, BASF), and 0.12 g di-n-butyltin dilaurate were heated to 90° C. with continuous stirring, and kept at this temperature until the titrimetrically determined free isocyanate group content reached a value of 0.63 wt. %. Then 62.3 g of N-(3-trimethoxysilyl)propylaminosuccinic acid diethyl ester was mixed in, and the mixture was stirred for 4 hours at 90° C. until free isocyanate could no longer be detected by IR spectroscopy. The product ("Polymer 2") was cooled down to room temperature and stored away from moisture (theoretical polymer content=89.7%).

The N-(3-trimethoxysilylpropyl)aminosuccinic acid diethyl ester used here was prepared as follows: 51.0 g 3-aminopropyltrimethoxysilane (Silquest® A-1110, Momentive) was added. 49.0 g maleic acid diethyl ester (Fluka) was added slowly at room temperature with good stirring, and the mixture was stirred for 8 hours at room temperature.

Preparation of Adhesive

The following were processed into a homogeneous paste in a vacuum mixer, using the weight proportions given in Table 1: Polymer 1, i.e. STP-E10 or STP-E30, and Polymer 2, diisodecylphthalate (DIDP; Palatinol® Z, BASF), dimethoxymethylsilylmethyl-β-methylcarbamate, finely divided coated chalk (Socal® U1S2, Solvay, dried), carbon black (dried at 130° C.), N-(2-aminoethyl)(3-aminopropyl)trimethoxysilane and di-n-butyltin dilaurate (DBTDL), and then the paste was stored away from moisture.

TABLE 1

Compositions (in parts by weight) and results.

|     |     | Ref. 1 | 1 | 2 | Ref. 2 | 3 | Ref. 3 | Ref. 4 |
| --- | --- | --- | --- | --- | --- | --- | --- | --- |
| SP1 | Geniosil ® STP-E30 |  | 7.5 | 15 | 50 |  |  |  |
|  | Geniosil ® STP-E10 |  |  |  |  | 7.5 | 42.5 | 50 |
| SP2 | Polymer 2 | 50 | 42.5 | 35 |  | 42.5 | 7.5 |  |
| DIDP |  | 18 | 18 | 18 | 18 | 18 | 18 | 18 |
| Drying agent[a] |  | 1 | 1 | 1 | 1 | 1 | 1 | 1 |
| Socal U1S2 |  | 15 | 15 | 15 | 15 | 15 | 15 | 15 |
| Carbon black |  | 15 | 15 | 15 | 15 | 15 | 15 | 15 |
| Adhesion promoter[b] |  | 1 | 1 | 1 | 1 | 1 | 1 | 1 |
| DBTDL |  | 0.15 | 0.13 | 0.11 | 0.0063 | 0.13 | 0.028 | 0.0063 |
| Tensile strength [MPa] |  | 5.0 | 4.9 | 5.3 | 6.9 | 5.3 | 5.5 | 5.8 |
| Elongation [%] |  | 417 | 415 | 461 | 629 | 450 | 462 | 522 |
| Tensile shear strength [MPa] |  | 4.8 | 4.6 | 3.9 | 2.6 | 4.0 | 4.1 | 4.0 |
| Tack-free time [min] |  | 70 | 47 | 18 | 29 | 38 | 36 | 32 |
| Early adhesion/4 h [%] |  | 10 | 10 | 10 | 90 | 10 | 75 | 50 |
| Early adhesion/8 h [%] |  | 20 | 50 | 70 | 75 | 60 | 60 | 50 |
| Creep (300 h) under load at: |  |  |  |  |  |  |  |  |
| 3.5% of tensile shear strength [%] |  | 26 | 75 | 67 | 50 h to break | 34 | 103 | 104 |
| 0.1 MPa [%] |  | 16 | 20 | 25 | 175 | 11 | 20 | 30 |

[a]Dimethoxymethylsilylmethyl-O-methylcarbamate
[b]N-(2-aminoethyl)(3-aminopropyl)trimethoxysilane Examples 1 to 4 show good creep behavior and short tack-free time (fast skin formation). Comparison Example Ref. 1 shows delayed skin formation (longer tack-free time), while Comparison Example Ref. 2 or Ref. 3 or Ref. 4 show increased creep compared to Examples 1 and 2, or 3.

What is claimed is:

1. A moisture-curing composition comprising:
at least one polymer SP1 having formula (IV)

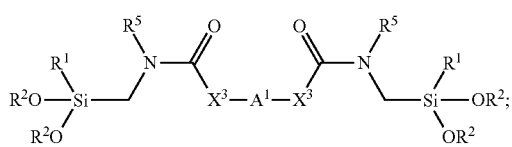

at least one polymer SP2 having formula (V)

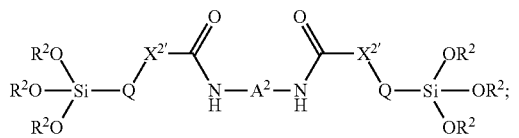

and optionally at least one polymer SP3 with end groups of formula (III) not including urea groups or urethane groups,

where:
$X^{2'}$ stands for

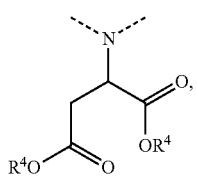

wherein $R^4$ stands for methyl, ethyl, propyl, or butyl;
$X^3$ stands for O or NH or $NR^{5'}$, where $R^{5'}$ stands for a linear or branched hydrocarbon residue with 1 to 20 C atoms;
$R^1$ and $R^3$ each independently stand for an alkyl group with 1 to 10 C atoms;
$R^2$ stands for an alkyl group with 1 to 5 C atoms;

$R^5$ stands for a hydrogen atom;
$Y^3$ stands for a hydrolyzable residue;
Q stands for a linear or branched alkylene residue with 3 to 6 C atoms;
$A^1$ stands for a divalent residue of a polymeric diol or polymeric diamine after removal of hydroxyl groups or amino groups;
$A^2$ stands for a divalent residue of an isocyanate-group containing polymer after removal of isocyanate groups; and
a stands for 0 or 1; and the dashed lines each represent binding of a group to the polymer,
with the proviso that:
the weight ratio of polymer SP1 to polymer SP2 is a value between 0.1 and 0.8, and
if polymers SP2 and SP3 are simultaneously present in the composition, the weight ratio of polymer SP2 to polymer SP3 has a value >1.1.

2. The moisture-curing composition as in claim 1, wherein the polymeric diol or polymeric diamine is a polyoxyalkylene diol.

3. The moisture-curing composition as in claim 1, wherein the residue Q stands for a residue selected from the group consisting of

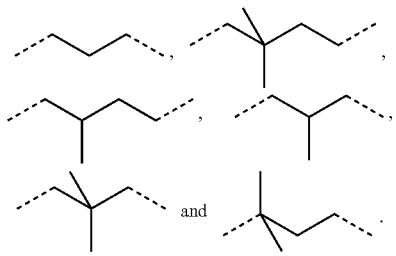

4. The moisture-curing composition as in claim 1, wherein the composition contains the polymer SP3 with end groups of formula (III), and the polymer SP3 is prepared by hydrosilylation of polymers with terminal double bonds.

5. The moisture-curing composition as in claim 1, wherein the composition contains only one polymer SP1 and at least one polymer SP2 as moisture-curing polymers.

6. The moisture-curing composition as in claim 1, wherein the proportion of polymer SP1 in the composition is 2-45 wt. %.

7. The moisture-curing composition as in claim 1, wherein the sum of the proportions of polymer SP2 and optional polymer SP3 in the composition is 10-70 wt. %.

8. The moisture-curing composition as in claim 1, wherein the composition further comprises:
20-50 wt. % filler,
0.1-10 wt. % organosilane
0.01-2 wt. % catalyst, and
0-20 wt. % plasticizer.

9. A cured composition obtained by reacting the moisture-curing composition as in claim 1 with water.

10. An adhesive, sealant, potting compound, or coating comprising the moisture-curing composition as in claim 1.

11. A method for bonding a substrate S1 with a substrate S2, comprising the steps of:
i) applying the moisture-curing composition as in claim 1 to a substrate S1; and
ii) bringing the applied composition into contact with a substrate S2 within an open time of the composition;
or
i') applying the moisture-curing composition to a substrate S1 and to a substrate S2; and
ii') bringing the applied compositions into contact with each other within an open time of the composition;
wherein the substrate S2 consists of material which is the same as or different from substrate S1.

12. An article obtained by the method as in claim 11.

13. The article as in claim 12, wherein the article is a structure, industrial goods or consumer goods, a means of transport, a mounted part on a means of transport, or an article of the furniture, textile, or packaging industry.

14. A method for sealing, comprising the step of:
i") applying the moisture-curing composition as in claim 1 to a joint formed by the surfaces or part of the surfaces of substrate S1 and substrate S2, where substrate S2 consists of material which is the same as or different from substrate S1 or where substrate S1 and substrate S2 form one piece.

* * * * *